United States Patent

Byers et al.

[11] Patent Number: 5,678,531
[45] Date of Patent: Oct. 21, 1997

[54] GRIDDLE ATTACHMENT FOR OUTDOOR GRILL

[76] Inventors: Thomas L. Byers, 5480 Stewart Dr., Mustang, Okla. 73064; G. Richard Byers, 15409 Frisco Rd., Piedmont, Okla. 73078

[21] Appl. No.: 619,973
[22] Filed: Mar. 20, 1996
[51] Int. Cl.⁶ ............................ F24C 3/00
[52] U.S. Cl. .............. 126/25 R; 126/41 R; 99/422; 99/425; 99/444
[58] Field of Search ............ 126/41 R, 25 R, 126/51; 99/422, 425, 426, 444

[56] References Cited

U.S. PATENT DOCUMENTS

| | | | |
|---|---|---|---|
| 4,119,021 | 10/1978 | Moses | 126/24 X |
| 4,909,137 | 3/1990 | Brugnoli | 126/41 R X |
| 4,930,491 | 6/1990 | Purello | 126/41 R X |
| 5,325,843 | 7/1994 | Bravata, Jr. | 126/25 R X |
| 5,529,798 | 6/1996 | Clark et al. | 126/41 R X |

*Primary Examiner*—Larry Jones
*Attorney, Agent, or Firm*—Dougherty & Hessin, P.C.

[57] ABSTRACT

A cooking griddle for use in combination with an outdoor grill that consists of a flat metal sheet unitarily formed to include opposite side walls, a rear splash panel, and a transverse grease trough formed along the front edge which extends to a right angle bend that aids in proper seating of the griddle on the grill.

4 Claims, 2 Drawing Sheets

GRIDDLE ATTACHMENT FOR OUTDOOR GRILL

BACKGROUND OF THE INVENTION

1. Field of the Invention

The invention relates generally to outdoor or portable cooking elements and, more particularly, but not by way of limitation, it relates to an improved griddle structure that may be used in combination with an outdoor grill or open fire.

2. Description of the Prior Art

Searching the prior art discloses a number of diverse cooking and barbecuing devices that have been developed down through the years. Many structures take the form of the well-known charcoal barbecuing grill, and such structures have been utilized in a large number of configurations that embody the briquette container plus grill concept. More recently, there have been developed various forms of gas-fired burner assemblies in combination with cooking grill. There have been relatively few teachings of a griddle/grill combination; however, U.S. Pat. No. 4,930,491 teaches the particular combination. This device teaches a portable, unitary cooking surface that includes both a griddle section and an adjacent charbroiling section that allows for simultaneous frying and charbroiling of food.

SUMMARY OF THE INVENTION

The present invention relates to an improved construction of a portable or outdoor cooking device which improvement is directed to a cooking griddle for use in combination with a barbecue grill or other cooking source. In particular, the griddle is adapted for installation on a standard form of barbecue grill; however, the griddle may be used with any number of different grill structures or, alternatively, it may be used over an open fire. The grill is formed from sheet metal as a rectangular expanse having a grease trough along the front edge, opposite side walls, and a rear splash panel with each of the side walls formed with an upper flange which can receive opposite-side legs for ground support of the griddle. A pair of adjustable brackets are secured to the back corners of the griddle to allow a predetermined forward pitch that allows free flow of grease runoff.

Therefore, it is an object of the present invention to provide a griddle for use in combination with a barbecue grill to diversify the cooking capability.

It is also an object of the present invention to provide such a cooking griddle that may also be leg-supported over an open fire.

Finally, it is an object of the present invention to provide a griddle for use in combination with a cooking grill that is safe and rugged in installation while being relatively easy to clean.

Other objects and advantages of the invention will be evident from the following detailed description when read in conjunction with the accompanying drawings that illustrate the invention.

DETAILED DESCRIPTION OF THE INVENTION

Figure 1:
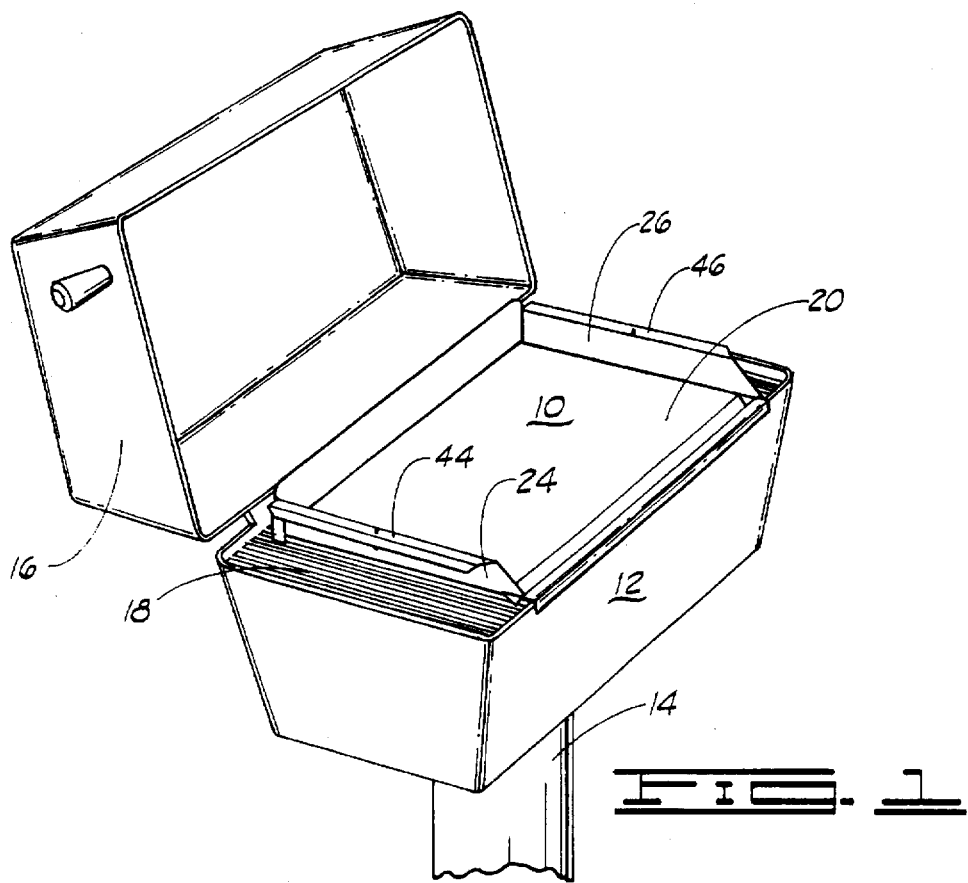
FIG. 1 is a perspective view of a removable griddle disposed in combination with an outdoor cooking grill.

FIG. 1 illustrates a cooking griddle 10 as it is disposed in combination with a barbecue grill 12, in this case a well-known type of gas grill that may be permanently installed relative to a gas source. The grill 12 includes a support stanchion 14, a hinged top lid 16 and a grate 18 that is normally used to support cooking food. In this case, the griddle 10 is supported on the grate 18 to provide a solid cooking surface 20 that is supported over the heat source beneath grate 18.

Figure 2:
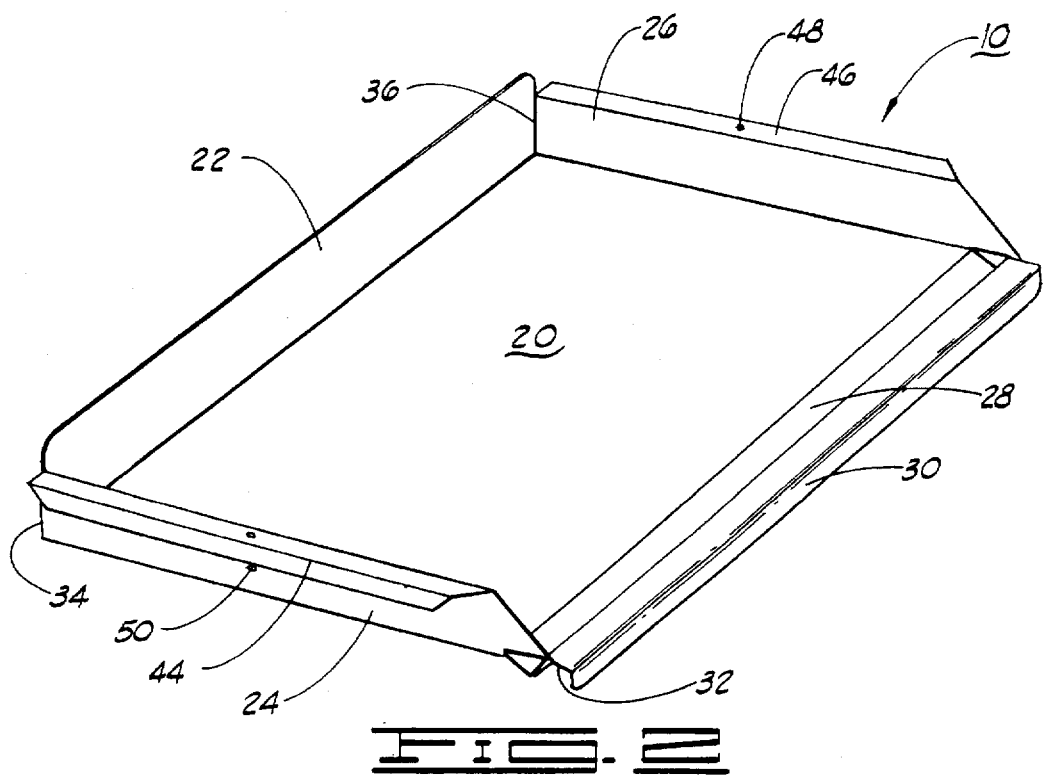
FIG. 2 is a perspective view of the cooking griddle.

Referring to FIG. 2, the griddle 10 may be formed from a unitary piece of sheet metal, e.g., a selected gauge stainless steel or the like, which is formed by metal bending. The griddle 10 is formed with a surface 20 formed into a backsplash panel 22 and opposite side walls 24 and 26. The front edge of surface 20 is bent through a 90° break to form a grease trough 28 while continuing forward with a right-angle bend 30 to form a front lip 32 that functions to hook over the associated grill front edge to prevent the griddle 10 from flipping rearward, e.g., when using a spatula or other scrape implement.

The grease trough 28 may be left open on each side, or, the opposite edges of trough 28 may be crimped and welded shut. Normally, when the front lip 32 is secured over the front edge of the grill 12, the grease trough 28 will drip downward within the front side of grill 12 in disposable manner. The rear corners 34 and 36 where side and back walls join are preferably fillet welded thereby to seal the griddle and avoid dripping at the rear corners. Thus, all grease and particle matter will be kept on the surface 20 and forward draining toward grease trough 28 can be adjustably maintained by means of a pair of levelling brackets 38 which are installed on each rear corner of the griddle 10 as shown in FIG. 3.

Figure 3:
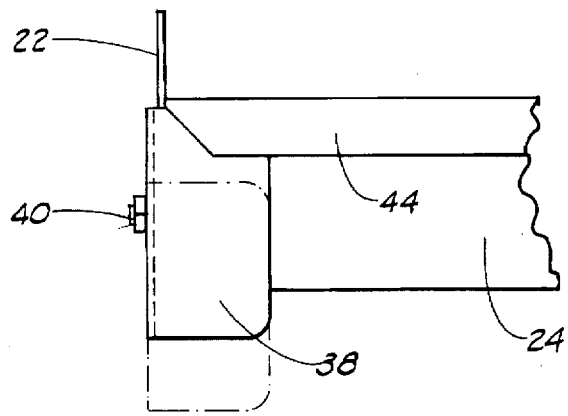
FIG. 3 is a partial view in side elevation of a rear corner of the cooking griddle.

Referring to FIG. 3, each of the right angle brackets 38 is adjustably secured on respective rear corners of griddle 10 by means of a suitable stud/bolt combination 40, and positioning of corner elements 38 may vary the rear height of griddle 10 from 0 to 0.75 inches, depending on the needed grease flow.

Figure 4:
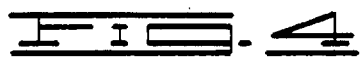
FIG. 4 is a view in side elevation of the cooking griddle with removable support legs affixed.

FIG. 4 illustrates an alternative usage of the griddle 10 wherein the griddle 10 is supported on opposite side leg braces 42. Each of opposite-side walls 24 and 26 has its upper edge bent to form respective square lip flanges 44 and 46 each having respective securing studs 48 and 50 secured therein. The support elements 42 are formed from a square tubing that is bent to form front and rear legs 52 and 54, respectively, the lower end of each of legs 54 and 52 is crimped and internally threaded to receive respective carriage bolts 56 and 58 which may be adjusted both as to griddle height and levelling of the griddle 10 relative to the supporting ground. Use of the opposite side camping legs 42 easily adapts the griddle for use over a campfire or a Coleman-type stove.

The foregoing discloses a novel form of griddle attachment that may be positioned on an existing cooking grill or that may be adapted and supported for use over an alternative source of heat such as a campfire or Coleman-type stove. The griddle structure is very stable and therefore safe for use in any of its various modes of operation as it provides an entirely new outdoor cooking capability. The griddle attachment is easily removed for cleaning and handling for subsequent storage.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A cooking griddle for use over a heat source, comprising:

a flat metal sheet that is unitarily formed to include opposite-side walls, a rear splash plate and a front edge;

a transverse grease trough formed along the front edge of said flat metal sheet;

means supporting said flat metal sheet over said heat source which includes opposite-side lip flanges formed on said opposite side walls; and first and second generally U-shaped members secured in respective lid flanges to extend forward and rearward ground-support legs.

2. A cooking griddle as set forth in claim 1 wherein said means supporting comprises:

a barbecue grill disposed over a heat source.

3. A cooking griddle for use over a heat source, comprising:

a flat metal sheet that is unitarily formed to include opposite-side walls, a rear splash plate and a front edge;

a transverse grease trough formed along the front edge of said flat metal sheet;

means supporting said flat metal sheet over said heat source; and first and second right angle brackets adjustably secured on the rear corners of said rear splash plate to adjust the forward cant of said flat metal sheet.

4. In combination, a barbecue grill having coals container and top grill, and a cooking griddle, comprising:

a flat metal sheet forming said griddle and unitarily formed to include opposite side walls, a rear splash plate and a front edge having a transverse grease trough and 90° bent front lip for non-slide positioning over the grill; and first and second right angle brackets adjustably secured on the rear corners of said rear splash plate to adjust for sheet angle to effect grease runoff.

* * * * *